United States Patent [19]

Lohnert et al.

[11] 4,010,070

[45] Mar. 1, 1977

[54] ABSORBER ELEMENT FOR PEBBLE-BED REACTORS

[75] Inventors: Günter Lohnert; Ulrich Müller-Frank, both of Bensberg, Germany

[73] Assignee: Interatom, Internationale Atomreaktorbau GmbH, Bensberg, Cologne, Germany

[22] Filed: Mar. 13, 1975

[21] Appl. No.: 558,131

[30] Foreign Application Priority Data

Mar. 16, 1974 Germany .................... 2412775

[52] U.S. Cl. .................... 176/86 R; 176/58 PB
[51] Int. Cl.² .................... G21C 7/10
[58] Field of Search ........... 176/86 R, 36 R, 58 PB; 175/203, 394

[56] References Cited

UNITED STATES PATENTS

| 153,807 | 8/1874 | Collins | 175/394 |
|---|---|---|---|
| 170,445 | 11/1875 | Montgomery | 175/394 |
| 228,044 | 5/1880 | Dine | 175/394 |
| 2,609,674 | 9/1952 | Groat | 175/203 |
| 2,919,902 | 1/1960 | Steffes | 175/394 |
| 3,034,975 | 5/1962 | Beurtheret | 176/81 |
| 3,728,218 | 4/1973 | Grutzmann et al. | 176/86 R |
| 3,751,336 | 8/1973 | Angelini et al. | 176/86 R |

FOREIGN PATENTS OR APPLICATIONS

| 1,911,400 | 9/1970 | Germany | 176/86 |

Primary Examiner—Harvey E. Behrend
Attorney, Agent, or Firm—Kenyon & Kenyon Reilly Carr & Chapin

[57] ABSTRACT

For gas-cooled pebble-bed reactors, an absorber element in the form of a hollow, helical spiral coil is proposed, which moves directly through the pebble bed essentially through rotary motion. This form not only facilitates the penetration into greater depths of the pebble bed, but also has a substantially greater absorber effect as compared to the known, essentially cylindrical absorber rods with the same absorber volume, so that the number of absorber elements can be reduced.

2 Claims, 2 Drawing Figures

ABSORBER ELEMENT FOR PEBBLE-BED REACTORS

BACKGROUND OF THE INVENTION

The present invention concerns absorber elements for pebble-bed reactors which are moved directly through the pebble bed.

In the German Pat. No. 12 63 939, rod-shaped control and shutdown elements are proposed, which are conically pointed at their end penetrating into the bed and are moved directly through the bed, displacing the spherical operating elements. During the operation of the reactor, these absorber elements are arranged outside the fission zone and, for emergency shutdown of the reactor, fall under the action of gravity through a reflector to a predetermined depth into the pebble bed and are thereupon pushed into their intended end position by a forced external drive to overcome the penetration resistance of the bed. It is, furthermore, proposed there already that from a given depth of penetration on, the absorber elements are set in motion by withdrawal or addition of the piled material alone, or in addition to other driving methods. From this, one can conclude that technical limitations are set for the depth of penetration of a vertically acting absorber element into a pebble bed.

In the German Offenlegungsschrift 17 64 922 it is proposed that in the region of the absorber elements, the reactor core is charged only with pure graphite spheres. In comparison with the fuel-containing spheres, these graphite spheres have a lower temperature, which is supposed to reduce the probability of a fuel-pebble fracture. Moreover, fracturing of the pure graphite spheres is ascribed little importance there.

In the German Offenlegungsschrift 18 15 916 it is proposed to make the absorber element solidly helical, not in the form of a coil, so that it can execute a longitudinal and rotary motion, the bed of spherical operating elements is to be loosened up, as the rod acts as a worm conveyer. The fuel spheres which are in the way of the entering rod are in part pushed upward, so that the volume of spheres displaced by the rod, which leads to high operational loading of the operating elements and the lateral and bottom reflector, is reduced by this part.

In the German Offenlegungsschrift 19 39 649 it is even suggested to provide in the lower part of the reactor core, so-called bypass chambers, in order to reduce the compression or distortion forces of the pebble bed in inserting the absorber rods, as well as the necessary impression forces of the absorber rods resulting therefrom and the stress on the spheres. In the German Offenlegungsschrift 21 12 472 an absorber element with a thread of different pitch provided at the circumference of the rod is proposed, which, however, is to be moved perpendicularly to the pebble bed, as in all absorber elements for pebble-bed reactors known so far.

The force P which is necessary to move an absorber element in a pebble bed depends on:
1. The geometrical quantities, sphere diameter d and rod diameter D.
2. The condition of the surface of the absorber element.
3. The shape of the point.
4. The depth of penetration h in the pebble bed.
5. The angle of penetration $\alpha$ against the horizontal.

The force P is opposed by the force of friction R and the forces F which the spheres displaced by the tip of the rod, exert on the rod. Both resistances are essentially functions of $h$ and $\alpha$. However, the friction force R increases far less with increasing depth of penetration H and constant angle of penetration $\alpha$ than the displacement force F which, for greater depths of penetration of about 2 to 5 m is essentially the sole determining factor for the magnitude of P.

With all absorber elements proposed so far, vertical movement, i.e., $\alpha = 90°$, is taken for granted. Independently of any method of driving and of the rod geometry, the point of the rod, no matter what its shape, moves through the pile of spheres vertically. For readily understood reasons, however, the force F has a maximum for $\alpha = 90°$. The arrangement of the spheres inside of a random pebble bed obeys a static distribution, according to which so-called stable sphere positions occur. If the tip of the rod encounters such a stable sphere position, this configuration must be broken by an increased expenditure of force. The motion which the sphere directly hit by the tip of the rod transmits to its neighboring spheres, is continued over five and more sphere diameters in the direction of the rod. As the motion of the rod tip is usually in a straight line and with the stable sphere position, five or more spheres are positioned one behind the other in such a manner that their points of contact lie on a straight line which represents the extension of the rod axis; the stable sphere position is maintained until the blocking column of spheres bulges. Each sphere which is moved in the pebble bed, influences its neighboring spheres. The deeper the motion propogates into the pebble bed, the larger are the forces which must be overcome by the tip of the rod. Each sphere which executes an upward movement influences all spheres which lie above it in a cone. The axis of this cone is vertical, its apex is at the center of the moving sphere and the aperture angle of this cone corresponds to the angle of repose of the pebble bed. All the spheres within this cone must therefore be moved or compressed by the one sphere.

The former assumption that the pebble bed is only compressed and its surface remains unchanged if an absorber element enters a pebble bed, has been found to be erroneous by model tests. For a smaller angle of penetration $\alpha$ the influence on deeper layers of spheres decreases, and the spheres can escape laterally, according to their horizontal motion component. For small angles of penetration $\alpha$, the same is naturally true as far as $\alpha = 90°$, in view of the rod tip meeting stable sphere positions, and here, too, the stable configuration persists until the straight column of spheres bulges. The bulging of this column of spheres, however, is facilitated by its oblique position. As soon as it is set in motion by the tip of the rod, it is, so to speak, bent by its own weight and the different loading by the columns of spheres above. The bulging force to be supplied and the duration of the stable sphere position are, therefore, less. The undesired effect of the stable sphere position is aided considerably if the tip of the rod moves on a straight line. The direction of the force vector coincides with the axis of a straight column of spheres in the case of a stable sphere configuration. If, on the other hand, the force vector changes direction, it circumvents possible stable sphere positions. If the tip of the rod executes, for instance, a circular path, this motion cannot be impeded by a stable configuration, as a curved column of spheres cannot transmit forces.

With the absorber elements for pebble bed reactors known heretofore, depths of penetration of about 2.5 m have been reached in tests. At greater depths of penetration, either the spheres are destroyed or the absorber rods begin to bulge out. In pebble-bed reactors of large output rating, however, depths of penetration of about 5 m are required, so that a reactor can be kept safely sub-critical also in cold condition.

SUMMARY OF THE INVENTION

An object of the present invention is an absorber element for pebble-bed reactors, which is moved directly through the pebble bed and which makes possible greater depths of penetration than with the absorber rods known heretofore.

To solve this problem, an absorber element is proposed whose direction of penetration into the pebble bed deviates from the vertical and can be varied during the motion in the pebble bed. Thereby, the problems of the stable sphere configuration already described above are avoided.

In a further embodiment of the invention it is proposed that the absorber element has the form of a hollow, helix-like spiral. The tip of this spiral, which is shaped in the manner of a simple cork screw with hollow interior, moves within the pebble bed at a small angle $\alpha$ and on a helical path.

In a specific embodiment of the invention it is proposed that this helical spiral has a single thread. Multithread spirals would have to have, in view of a meaningful spacing between the threads, a considerably larger angle of penetration, which requires a considerably greater force of penetration P.

In a further embodiment of the invention it is proposed that the helix-like spiral is made movable in the area of the pebble bed by a torque. Above the pebble bed and also within a certain small depth of penetration, which is attended only by a small force of penetration, the proposed absorber element is to be additionally moved axially as with the known absorber rods. Within the pebble bed, this abosrber element should be moved, however, only by the torque to the greatest possible depths of penetration. With this kind of motion, the spiral is screwed into the pebble bed like into a thread, particularly for greater depths of penetration, where the most heavily stressed turn is later even braced against the turns located further upward within the pebble bed.

In a further embodiment of the invention it is proposed that the inside diameter of the spiral as also the vertical clearances between two turns are larger than the outside diameter of the spherical operation elements used. This arrangement avoids that individual spheres are jammed between the turns of the spiral.

BRIEF DESCRIPTION OF THE DRAWINGS

The presently preferred mode for carrying out this invention is schematically illustrated by the accompanying drawings, in which.

DETAILED DESCRIPTION OF THE INVENTION

Figure 1:
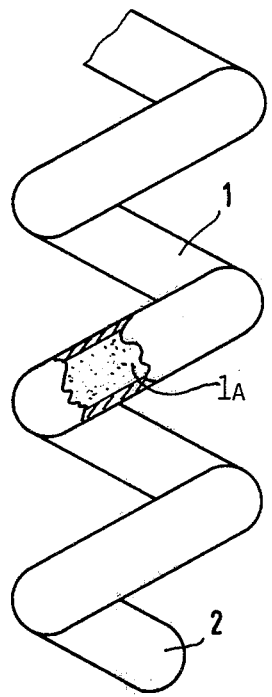
FIG. 1 in vertical elevation shows the lower end portion of the absorber element.

As indicated above, FIG. 1 shows only the lowermost portion of an absorber element 1 having its leading tip 2, which must directly penetrate the pebble bed, having a substantially hemispherical shape, although other known tip shapes could be used. As shown, behind the tip 2, the element 1 has the shape of a substantially helically coiled rod, forming a single thread as contrasted to a multi-threaded or double-helical shape which would result in a considerably larger angle of pebble-bed penetration and, therefore, would require a considerably greater force of penetration P. The rod is preferably made of a suitable metal and is hollow or tubular, and is filled with the absorber material. Assuming that the pebbles or fuel spheres of the pebble bed have a characteristic cross-sectional size or diameter of 60 mm, the outside diameter of the element's rod or tube should likewise be about 60 mm. The element has an inside diameter and an axially directed coil convolution separation distance which are both greater than the cross-sectional dimension or diameter of the rod or tube used, and of the pebbles or fuel spheres. The tip 2 is formed by the leading end of the rod or tube, possibly as a integral part of the balance.

Figure 2:
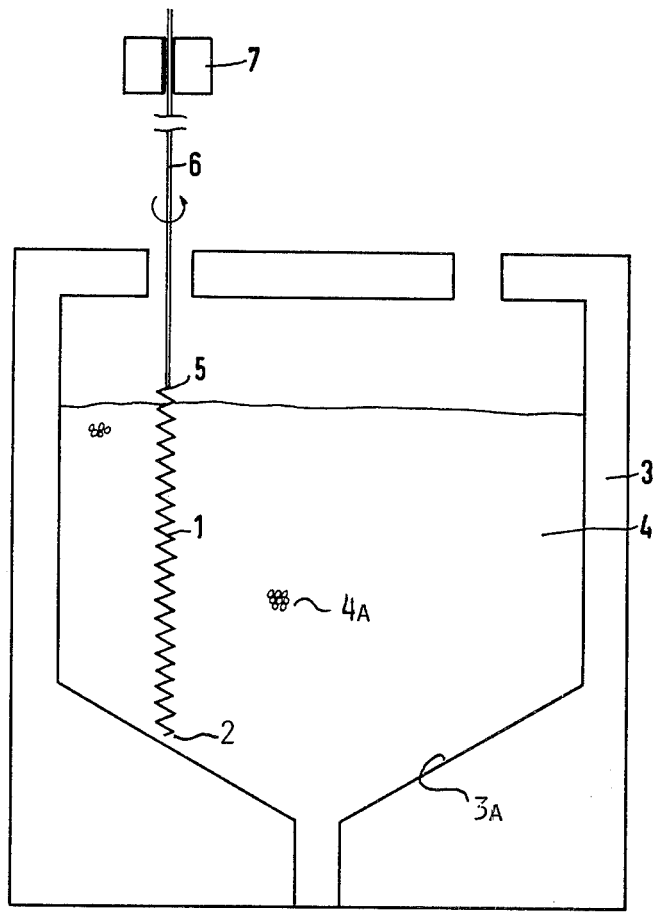
FIG. 2 in vertical section shows a gas-cooled pebble-bed reactor of large output rating with one of the absorber elements substantially fully penetrating the pebble bed.

In FIG. 2, the reactor container 3 is shown, containing the pebble bed 4 made up of a large number of pebbles or fuel spheres of which only a few are indicated at 4a. Only one of the new absorber elements 1 is shown, but of course, a larger number would ordinarily be provided. These would be distributed over the circumference of the bed 4 which has a generally cylindrical contour excepting for the conical run-out 3a of the container 3. The element 1 is shown substantially completely inserted in the bed 4. The upper end of the element 5 is provided with a tubular shank 6 provided with a rotative drive 7 which may also provide for vertical movement to the extent required for the initial insertion of the element 1, after which rotation of the element 1 effects its complete penetration into the bed 4. As previously indicated, the active portion of the rod 1 is itself hollow or tubular as shown by the broken-away segment in FIG. 1, the absorber material 1a then being on the inside of the rod or tube 1.

It can be seen that the tip 2 is directed to penetrate the bed 4 in a non-vertical direction, and that this direction varies angularly during penetration of the tip in the bed. Behind the tip 2 the element 1 has the shape of the substantially helically coiled rod or tube. The interior of the helical shape and the spaces between the helical convolutions are open and permit the passage of the fuel sphere or pebbles.

The new absorber element in its form of a helical spiral coil with its hollow or empty spaces both within the convolutions and from one convolution to another, has additional advantages over the described easier penetration. From the viewpoint of nuclear physics, the absorber effect of an absorber element depends essentially on the size of its surface, so the new element, for the same absorber volume, has a considerably greater absorber effect than would a conventional solid cylindrical rod, of the same diameter as the outside diameter of the new helical element, because the ratio of the surface to the volume is greater for the helical form. Therefore, the number of absorber element required for the reactor, can be reduced substantially, which is important with respect to the space requirement and the costs for the absorber drives, such as the drive illustrated schematically at 7.

What is claimed is:

1. A pebble-bed reactor comprising a reactor container, fuel pebbles having a characteristic cross-sectional size and forming a reactor pebble bed in said container, and at least one absorber element comprising a rod having an outside diameter substantially the same as said characteristic cross-sectional size of said fuel pebbles, said rod having the shape of a hollow helix-like spiral forming a single thread terminating with a leading tip, said element being substantially vertically positioned so that by applying torque to said element said rod is screwed into said pebble bed like being screwed into a thread with the rod's said tip having a direction of penetration into said pebble bed which deviates from a vertical direction.

2. The reactor of claim 1 in which the rod's said shape forms an interior and convolutions forming spaces, said interior and said spaces having cross-sectional sizes larger than said characteristic cross-sectional size of said pebbles and forming passages for the pebbles.

* * * * *